(12) United States Patent
Vigorito et al.

(10) Patent No.: US 8,124,872 B2
(45) Date of Patent: Feb. 28, 2012

(54) ELASTOMERIC PORTABLE ELECTRICAL OUTLET BOX

(75) Inventors: Thomas J. Vigorito, Bridgeport, CT (US); Thomas L. Scanzillo, Monroe, CT (US)

(73) Assignee: Hubbell Incorporated, Shelton, CT (US)

( * ) Notice: Subject to any disclaimer, the term of this patent is extended or adjusted under 35 U.S.C. 154(b) by 996 days.

(21) Appl. No.: 12/043,326

(22) Filed: Mar. 6, 2008

(65) Prior Publication Data

US 2009/0224423 A1 Sep. 10, 2009

(51) Int. Cl.
*H02G 3/08* (2006.01)

(52) U.S. Cl. ............. 174/50; 174/53; 174/565; 220/3.2; 220/3.3

(58) Field of Classification Search .................... 174/50, 174/53, 57, 58, 480, 481, 17 R, 556, 559, 174/564, 520; 220/3.2–3.9, 4.02; D13/152, D13/158, 184; 439/535, 536; 361/600, 601, 361/752, 724, 730, 679.01; 264/272.15
See application file for complete search history.

(56) References Cited

U.S. PATENT DOCUMENTS

| | | | |
|---|---|---|---|
| 2,378,861 A | 6/1945 | Peevey | |
| 2,867,349 A | 1/1959 | Parker, Jr. | |
| 2,875,915 A * | 3/1959 | Buckels | 220/3.7 |
| 2,989,206 A | 6/1961 | McAfee | |
| 3,622,029 A | 11/1971 | Ware | |
| 3,635,305 A * | 1/1972 | Kunishi et al. | 174/50 |
| 3,724,706 A | 4/1973 | Slocum | |
| 3,770,873 A | 11/1973 | Brown | |
| 4,134,636 A | 1/1979 | Kleinatland et al. | |
| 4,408,695 A | 10/1983 | Balkwill et al. | |
| 4,634,015 A | 1/1987 | Taylor | |
| 4,884,715 A | 12/1989 | Pohlmann | |
| 5,012,043 A | 4/1991 | Seymour | |
| D341,353 S | 11/1993 | O | |
| 5,621,189 A | 4/1997 | Dodds | |
| 5,959,246 A | 9/1999 | Gretz | |
| 5,965,846 A | 10/1999 | Shotey et al. | |
| 6,323,418 B1 * | 11/2001 | Tiburtius et al. | 361/752 |
| 6,492,589 B1 * | 12/2002 | Smith | 174/50 |
| 6,521,830 B1 * | 2/2003 | Platz | 174/50 |
| 6,820,760 B2 | 11/2004 | Wegner et al. | |
| 6,874,295 B2 | 4/2005 | Anderson | |
| 7,098,399 B1 * | 8/2006 | Gretz et al. | 174/58 |
| D531,128 S | 10/2006 | Elberson | |
| 7,166,800 B2 * | 1/2007 | Shaw et al. | 174/50 |
| D538,751 S | 3/2007 | Kiely | |
| 7,388,162 B1 * | 6/2008 | Gretz | 174/480 |
| 7,754,967 B2 * | 7/2010 | Kruse et al. | 174/53 |

* cited by examiner

*Primary Examiner* — Angel R Estrada
(74) *Attorney, Agent, or Firm* — Garrett V. Davis; Mark S. Bicks; Alfred N. Goodman

(57) ABSTRACT

A portable junction or outlet box is provided having an elastomeric outer layer to provide impact resistance and abrasion resistance to the electrical box. The outer layer encloses the outer surface of a rigid electrical box and overlies the side walls and end walls of the electrical box. The corners of the outer layer define a thickened portion relative to the side portions of the outer layer to increase the impact resistance.

37 Claims, 6 Drawing Sheets

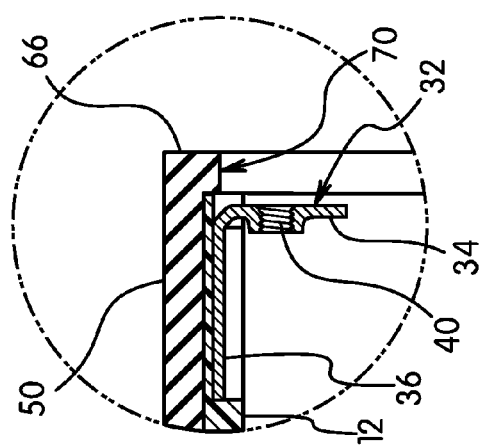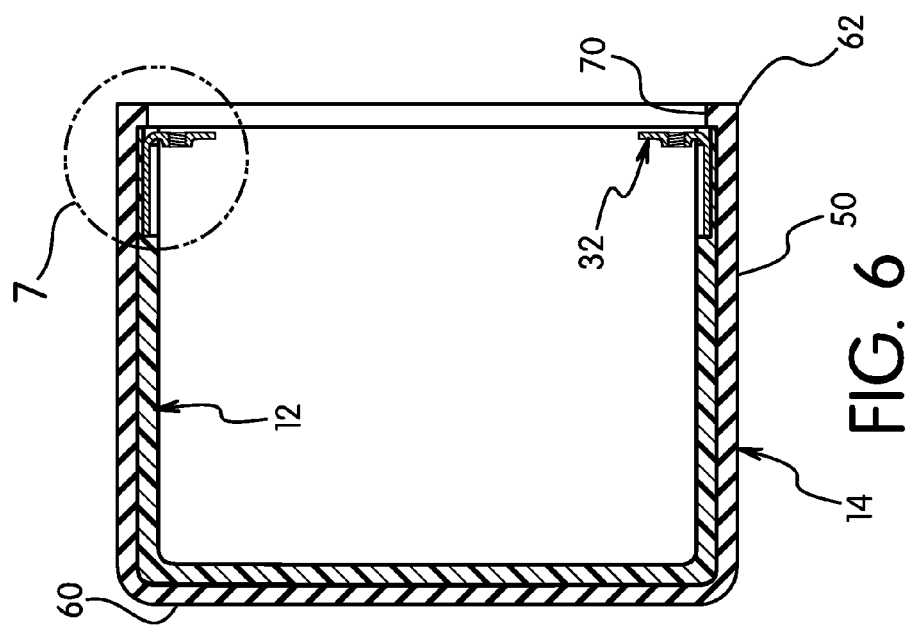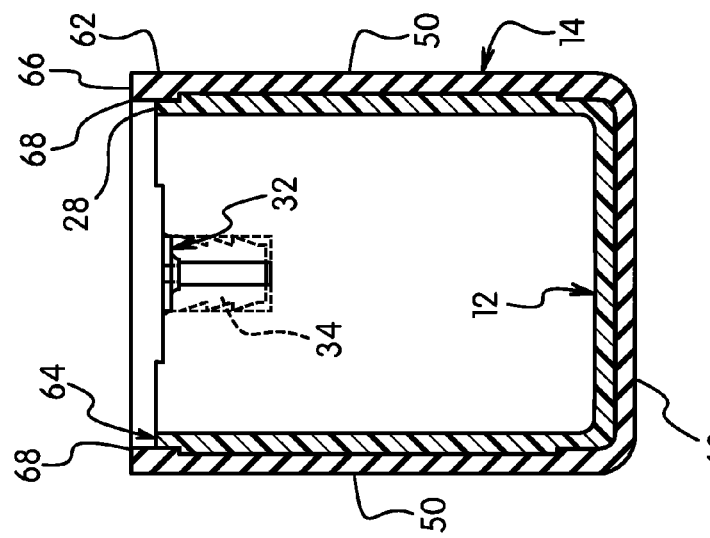

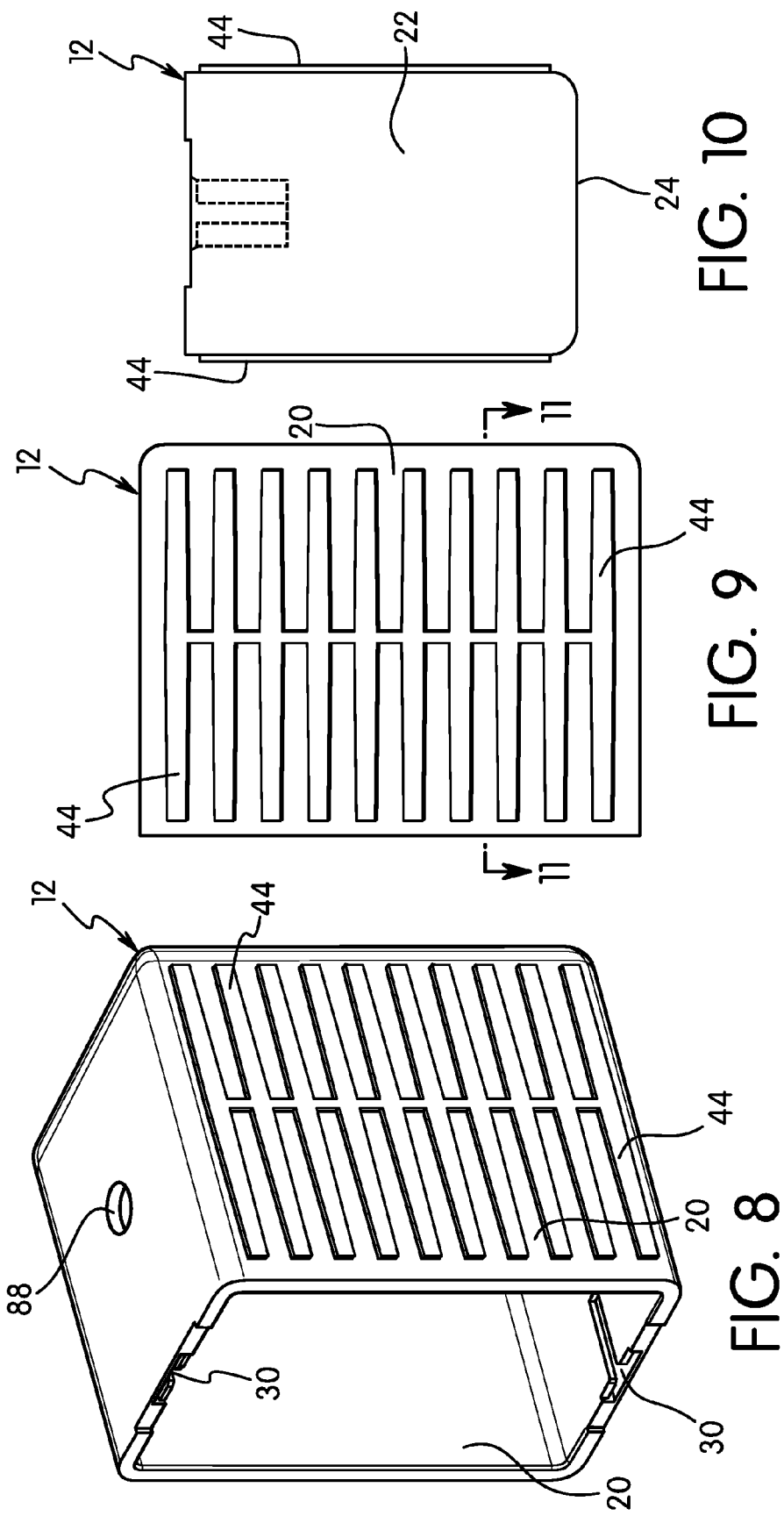

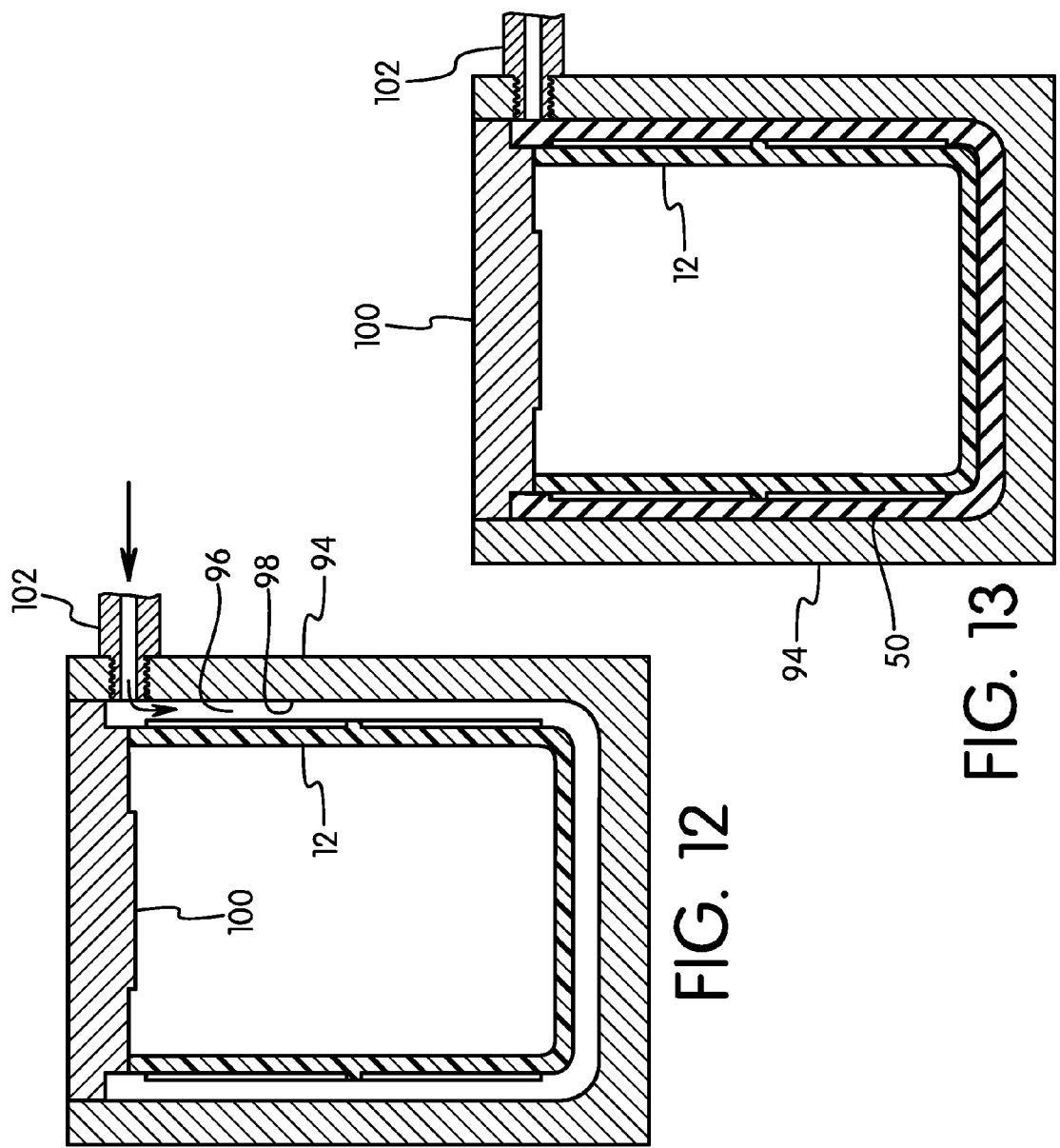
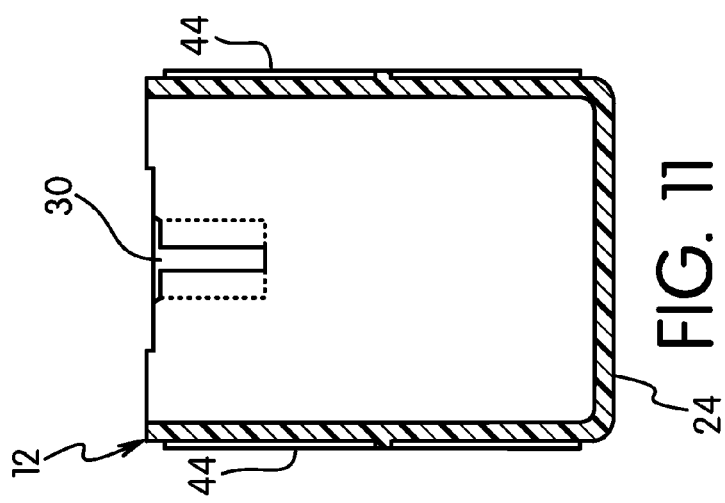
FIG. 11
FIG. 12
FIG. 13

US 8,124,872 B2

ELASTOMERIC PORTABLE ELECTRICAL OUTLET BOX

FIELD OF THE INVENTION

The present invention is directed to an impact resistant electrical outlet box or electrical junction box. The invention is further directed to an electrical box having an elastomeric outer layer surrounding a rigid box to provide impact resistance during use.

BACKGROUND OF THE INVENTION

Electrical boxes are commonly mounted to a stud or other support structure for supporting an electrical device and enclosing electrical wiring. The electrical boxes are often mounted in a variety of positions and locations in the wall or ceiling.

Portable electrical junction boxes typically are attached to an electrical cable or cord such that the boxes can be moved to a suitable location during use. The portable electrical boxes are particularly suitable for construction sites where electrical power is needed in different locations and can be moved to different locations as needed during work. The portable electrical junction box generally provides an electrical receptacle to provide electrical power to tools, lights and the like. During use, particularly on construction sites, the portable electrical junction boxes are subjected to physical abuse which can result in damage to the box.

Various electrical boxes have been developed for numerous purposes. One example is disclosed in U.S. Pat. No. 3,724,706 to Slocum which discloses an explosion proof junction box having a cap and a body portion. The body portion forms the junction box as a one piece molded structure. The body portion and cap are provided with an outer layer formed from a polymeric material such as polyvinyl chloride. The outer layer is formed with flexible flanges for forming a seal between the cap and the body portion.

Another example is disclosed in U.S. Pat. No. 5,621,189 to Dodds which discloses a conduit and a cover. The outer surfaces of the cover and the body are coated with a corrosion resistant polymeric material. The coating is disclosed as being a flexible, durable impact resistant polymer such as polyvinyl chloride.

U.S. Pat. No. 4,134,636 to Kleinatland et al. discloses an electrical outlet box with recesses on the outer surface and opening in a flange for receiving screws. The box includes an interior sleeve for telescopic engagement with the box.

U.S. Pat. No. 6,820,760 to Wegner et al. discloses an electrical outlet box extension having an interior sleeve with a plurality of ribs along its exterior surface. The interior sleeve also includes a plurality of fastening brackets for fixedly attaching the interior sleeve to an exterior ring. The exterior ring is attached to an electrical box.

U.S. Pat. No. 2,373,861 to Brown discloses an electrical box extension that slides within the opening of the electrical box. The upper surface of the box includes inwardly extending flanges with an opening for receiving screws to adjust the position of the sleeve.

Other electrical boxes are also disclosed in U.S. Pat. Nos. 2,378,861 to Peevey, U.S. Pat. No. 2,867,349 to Parker Jr., U.S. Pat. No. 3,684,819 to Wilson, U.S. Pat. No. 4,408,695 to Balkwill et al., U.S. Pat. No. 4,884,715 to Pohlmann, U.S. Pat. No. 7,038,129 to Fox and U.S. Pat. No. 6,974,295 to Anderson.

While each of the prior devices has been generally suitable for the intended purpose, there is a continuing need in the industry for an improved portable electrical box.

SUMMARY OF THE INVENTION

The present invention is directed to a portable electrical box for coupling directly to an electrical source and for supplying electricity to an electrical device. The invention is particularly directed to an impact resistant electrical junction box having an impact resistant outer layer and a rigid inner structure.

Accordingly, one aspect of the invention is to provide an impact resistant electrical junction box formed from a rigid material having an outer portion formed from an impact resistant plastic material. The outer impact resistant portion in one embodiment is made from an elastomeric material that is sufficiently flexible to protect the electrical box from damage under normal working conditions. The outer impact resistant portion is preferably a continuous outer layer formed from the elastomeric material. The outer impact resistant portion can have a non-uniform or variable thickness with the thicker portions in areas that are prone to continuous abrasion and impact. In one embodiment, the corners of the outer impact resistant portion are thicker than the middle portions.

Another aspect of the invention is to provide a portable electrical box that can be connected to an electrical power cord or cable to be movable to different locations as needed. In one embodiment, the portable electrical junction box is provided with a mounting structure for mounting an electrical device in the electrical box and for mounting a face plate on or over the electrical device to close an open end of the electrical box. In one embodiment, the electrical device is a duplex receptacle that can be connected to a plug of an electrical tool or light.

Another aspect of the invention is to provide a method of forming an electrical junction box having an impact resistant outer portion. The outer portion of the electrical junction box is made from a resilient polymeric material having sufficient flexibility to inhibit damage to the portable electrical box. The impact resistant outer portion of the electrical junction box is typically an outer layer that is molded over the electrical box in a permanent manner to prevent separation of the outer layer from the electrical box.

The outer layer of the electrical junction box is formed with the impact resistant outer layer molded directly on or over the outer surface of the inner electrical box. In one embodiment of the invention, the outer surface of the electrical box includes outwardly projecting members that are able to interlock with the outer layer as it is formed on the surface of the electrical box. The outer layer can be molded directly onto the outer surface of the box so that the projecting members interlock with the molded outer layer to prevent separation of the outer layer and the inner electrical box.

Another aspect of the invention is to provide an electrical box with an outer layer of an impact resistant polymer where the outer layer forms a skirt extending axially from the open end of the box. The skirt forms a recess for receiving a face plate to close the open end.

These and other aspects of the invention are basically attained by providing an electrical junction box comprising a box formed from a rigid material and having first and second side wall and end walls extending between the first and second side walls. The open front end is constructed to receive an electrical device. An outer layer made from an elastomeric polymer is adhered to the outer surface of the box. In one embodiment, a rear wall is connected to the side and end walls to form a closed bottom and an open front end.

The various aspects of the invention are also attained by providing an electrical junction box having an inner wall made from a rigid material and having an open end adapted for receiving an electrical device. An outer wall encloses the outer wall and is adhered to the outer surface of the inner wall. The outer wall is made from an elastomeric polymeric material.

The aspects of the invention are yet further attained by providing a method of producing an electrical junction box comprising the steps of positioning a rigid electrical box in a mold to define a mold cavity between an inner surface of the mold and an outer surface of the electrical box. The electrical box has first and second side wall, first and second end walls extending between the side walls, and an open front side. An elastomeric polymer is introduced into the mold cavity to mold an outer wall from the elastomeric material on the outer surface of the electrical box. The outer wall has a thickness to provide impact resistance to the electrical junction box.

These and other aspects and salient features of the invention will become apparent from the following detailed description of the invention, which taken in conjunction with the annexed drawings, disclose various embodiments of the invention.

BRIEF DESCRIPTION OF THE DRAWINGS

The following is a brief description of the drawings, in which:

FIG. 5 is an end view in cross-section of the electrical junction box taken along line 5-5 of FIG. 1 showing the inner box and the outer layer;

FIG. 6 is a side view in cross-section of the electrical junction box taken along line 6-6 of FIG. 1 showing the inner box, outer layer and the mounting tab for coupling with an electrical device;

FIG. 7 is an enlarged side view in cross-section of the mounting tab coupled to the end wall of the electrical box;

FIG. 8 is a perspective view of the inner electrical box showing the ribs for interlocking with the outer layer;

FIG. 9 is a side view of the inner electrical box of FIG. 8;

FIG. 10 is an end view of the inner electrical box of FIG. 8;

FIG. 11 is an end view in cross-section of the inner electrical box taken along line 11-11 of FIG. 9;

FIG. 12 is a cross-sectional end view of the mold for forming the outer layer on the inner electrical box and showing the electrical box positioned in the mold cavity;

FIG. 13 is a cross-sectional end view of the mold showing the elastomeric polymer being injected into the mold cavity and forming the outer impact resistant layer.

DETAILED DESCRIPTION OF THE INVENTION

The present invention is directed to an electrical outlet box or junction box. In particular, the invention is directed to a portable electrical outlet box having an impact resistant outer portion. The outer portion is typically in the form of an outer layer enclosing the electrical box.

Figure 1:
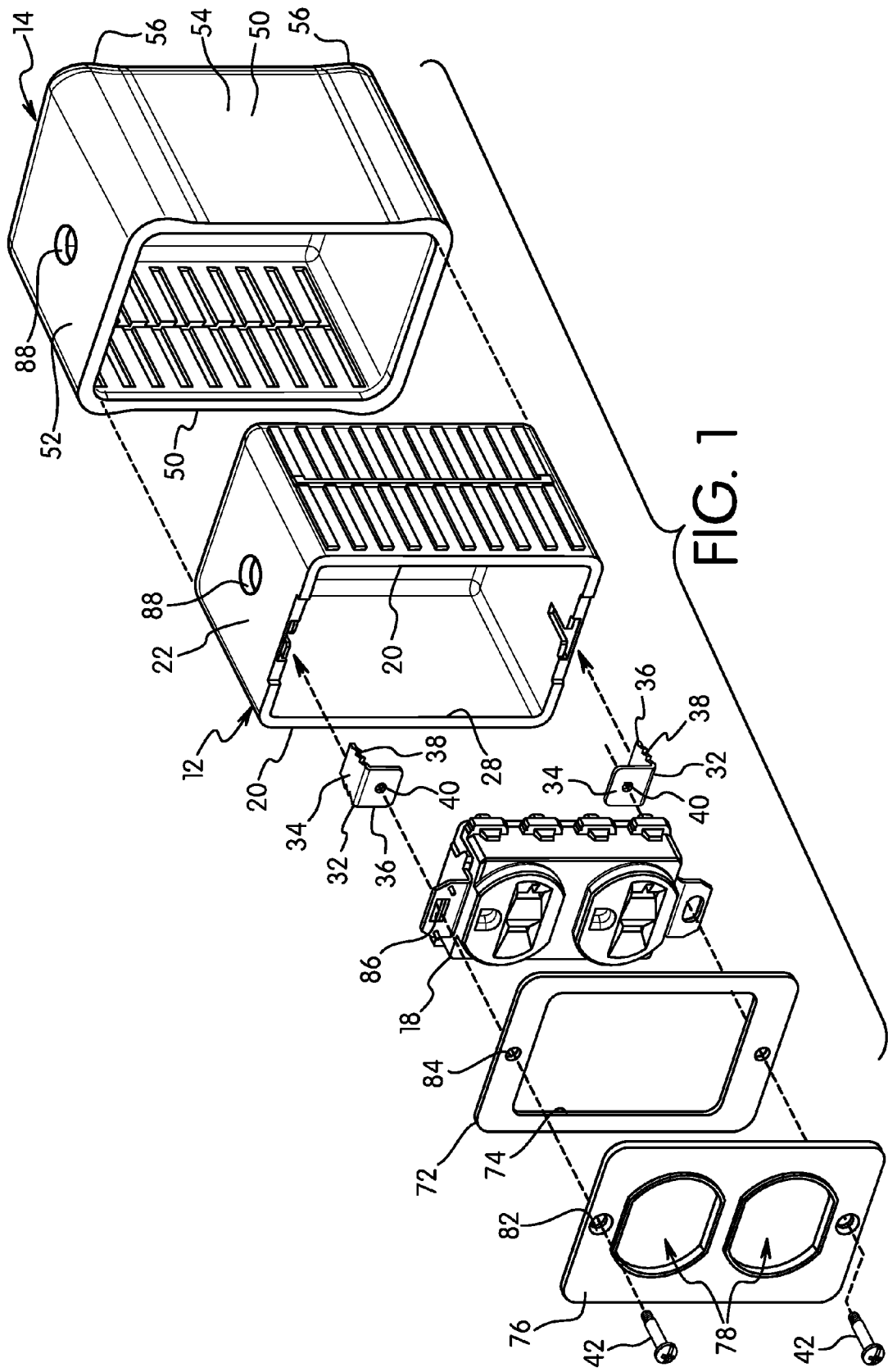
FIG. 1 is a perspective exploded view of the electrical junction box in a first embodiment of the invention showing the electrical box and outer impact resistant layer.
Figure 2:
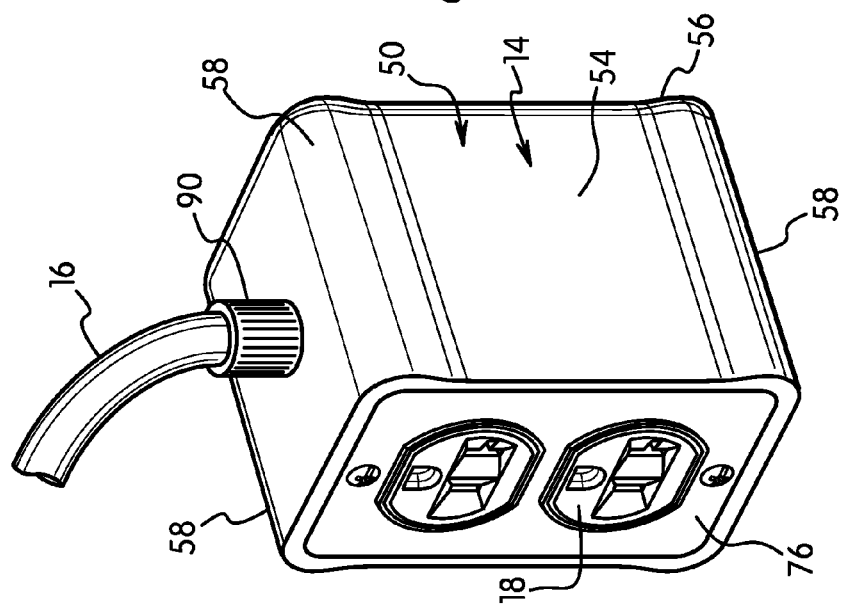
FIG. 2 is a perspective view of the portable electrical box of the embodiment of FIG. 1 showing the impact resistant outer layer molded onto the electrical box and the electrical cord coupled to the electrical box.

Referring to the drawings, the portable electrical outlet box 10 of the invention includes an electrical box 12 and a molded outer portion shown as outer layer 14. FIG. 1 is an exploded view of the electrical outlet box 10 to illustrate the box 12 and outer layer 14. In use, the outer layer 14 is formed on the outlet box 10 as a one piece unit. Electrical outlet box 10 which can function as an electrical junction box is designed to be portable and can be connected to an electrical cable or conduit 16 as shown in FIG. 2. The electrical box 12 defines an inner wall and the outer layer 14 defines an impact resistant outer wall of the electrical outlet box 10.

Electrical outlet box 10 as shown in FIG. 1 has a shape and dimension similar to a conventional electrical box for receiving an electrical device such as a duplex electrical receptacle 18. In the embodiment illustrated, electrical box 12 is a single gang box having a substantially rectangular configuration with opposite side walls 20 and end walls 22. In other embodiments, electrical box 12 can be a multiple gang box to support multiple electrical devices such as electrical receptacles, switches, and the like. A bottom wall 24 closes the bottom end of electrical box 12. In one embodiment of the invention, side walls 20 and end walls 22 have a substantially uniform thickness. The walls have a thickness sufficient to provide the desired strength and structural integrity. Electrical box 12 has an open front end 26 formed by a front edge 28. Front edge 28 is provided with a slot 30 formed in each of the end walls 22 that extend in the plane of end walls 22. Alternatively, electrical box 12 can have mounting holes for receiving a mounting screw or other fastener member to attach an electrical device to the box. The screw holes can be provided in the front edge.

Electrical box 12 can be molded as a one piece member made of a rigid plastic. Typically, side walls 20 and end walls 22 have a substantially uniform thickness.

A mounting tab 32 is received in the respective slot 30 for supporting and mounting electrical device 18. As shown in FIG. 1, mounting tabs 32 have a substantially L-shape with a first leg 34 and a second leg 36 extending substantially perpendicular to each other. First leg 34 has side edges with serrated teeth 38 for gripping the inner surface of slot 30 and permanently coupling mounting tab 32 to electrical box 12. Second leg 36 has a threaded hole 40 for receiving mounting screws 42 for mounting electrical device 18 to mounting tabs 32. Mounting tab 32 is preferably made of metal for grounding the electrical device and for mounting the electrical device in a secure manner.

Electrical box 12 has an outer surface with a plurality of interlocking members 43 extending outwardly from electrical box 12. In the embodiment illustrated, interlocking members 43 are in the form of substantially parallel ribs 44. The interlocking members as shown in FIG. 1 are formed on side walls 20 and extend outwardly a distance to engage and interlock with outer layer 14. In the embodiment illustrated, the ribs 44 have a longitudinal dimension extending from the front edge 28 to a back edge 46 of the electrical box along side walls 20. Ribs 44 are spaced a slight distance from front edge 20 and back edge 46 as shown in FIGS. 8 and 9. A brace portion 48 extends perpendicular to ribs 44 to integrally connect the ribs together. As shown in FIG. 9, brace 48 extends substantially perpendicular to the longitudinal dimension of ribs 44 and is positioned in the center of side walls 20 of electrical box 12.

In the embodiment shown, the interlocking members are in the form of parallel ribs. In other embodiments, the interlocking members can have other shapes that project outwardly from the surface of the electrical box. Alternatively, the interlocking members can be recesses. The projections and recesses can have various shapes and dimensions so long as they are able to interlock with the outer layer to resist separation.

Electrical outlet box 10 is formed with outer layer 14 molded directly onto and over electrical box 12 to form a one piece article. Outer layer 14 is attached to electrical box 12 to prevent separation of outer layer 14 from electrical box 12. In one embodiment of the invention, outer layer 14 is molded directly onto the outer surfaces of electrical box 12 so that the outer layer bonds and/or adheres to the surface of the electrical box. Outer layer 14 can form an outer wall of electrical box 12.

Outer layer 14 surrounds electrical box 12 to form a protective impact resistant layer to prevent damage to electrical box 12. In a preferred embodiment, outer layer 14 is formed from an elastomeric polymer material that is sufficiently resilient and flexible to provide impact resistance to outlet box 10. Preferably, outer layer 14 is formed from an elastomeric polymer having a hardness less than the hardness of electrical box 12 to provide impact and abrasion resistance. One example of a suitable material for forming the outer layer is a polybutylene rubber. Electrical box 12 is typically formed of a molded rigid plastic material and is formed as a one piece unit. One example of a rigid plastic material suitable for forming the electrical box is polyvinyl chloride.

Figure 4:
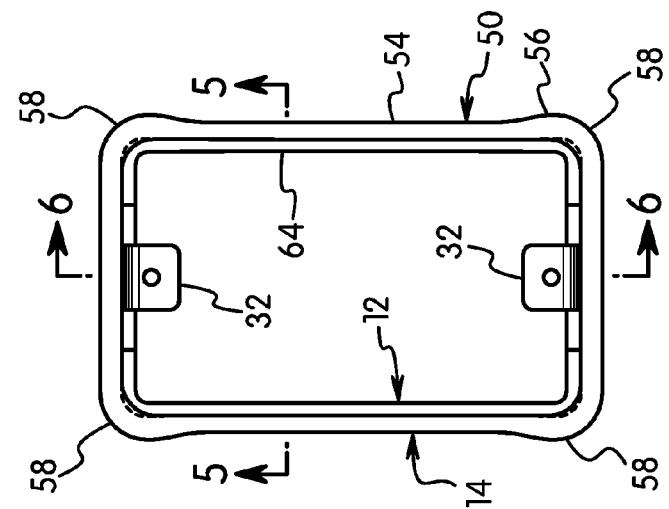
FIG. 4 is a front view of the electrical junction box of FIG. 1.
Figure 3:
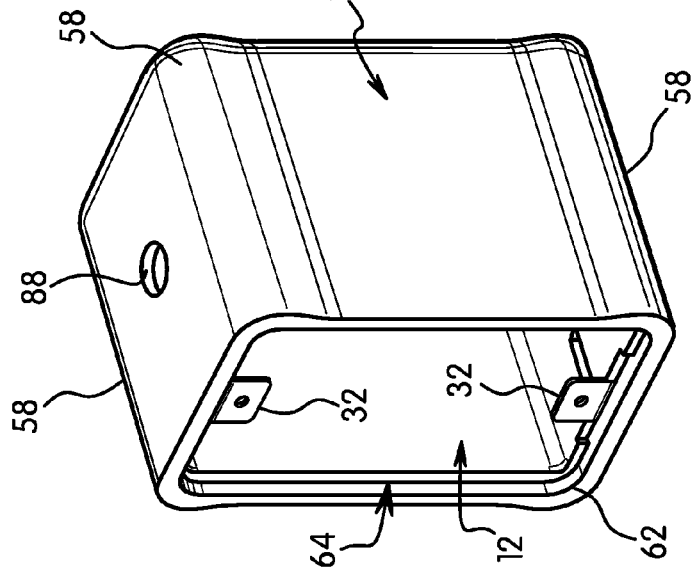
FIG. 3 is a perspective view of the electrical box of the embodiment of FIG. 1 showing the inner box and the outer layer.

Referring to FIGS. 3 and 4, outer layer 14 is formed on electrical box 12 to envelope the outer surfaces of electrical box 12. Outer layer 14 has side portions 50 overlying side walls 20 and end portions 52 overlying end walls 22. Side portions 50 have a middle portion 54 between the ends 56. The middle portions 54 have a substantially uniform thickness while the side portion as a whole has a non-uniform thickness. As shown in FIG. 4, middle portion 54 has a thickness slightly less than the thickness of the ends 56 to define a substantially concave profile as shown in FIG. 4. End portions 52 have a thickness greater than middle portion 54 and substantially equal to the ends 56 of side portions 50.

Side portions 50 and end portions 52 converge to define corners 58 having a rounded profile. The corners 58 have a thickness greater than a thickness of the middle portions 54 to provide a level of impact resistance greater than the side portions. Outer layer 14 includes a back portion 60 overlying bottom wall 24 of electrical box 12. In one embodiment, outer layer 14 has a thickness greater than the thickness of the walls of electrical box 12. As shown in FIG. 4, corners 58 and end portions 52 have a thickness greater than a thickness of the walls of electrical box 12.

In one embodiment, end portions 52 and corners 58 have a thickness greater than a thickness of the wall of box 12 and have a thickness to provide impact resistance and to protect box 12 from damage. In the embodiment shown, middle portions 54 have a thickness substantially equal to the side wall of box 12 and end portions 52 and corners 58 have a thickness twice the thickness of the walls of box 12.

Referring to FIGS. 5 and 6, outer layer 14 has a width greater than the width of side walls 20 and end walls 22 of electrical box 12 to define a flange shown as a skirt 62 extending from open end 26 of electrical box 12. Skirt 62 has a length to define a recess 64 between an outer face 66 of outer layer 14 and front edge 28 of electrical box 12. The recess 64 forms a stepped lip portion with a dimension to receive a cover face plate. Preferably, lip 64 has a depth at least equal to a thickness of the cover face plate. As shown in FIG. 15, side portions 50 of outer layer 14 have an inner edge 68 aligned with the outer face of side walls 20. Ribs 44 which form the interlocking members are embedded in the side portions 50 of outer layer 14 as shown in FIG. 5.

Referring to FIGS. 6 and 7, skirt 62 of outer layer 14 has an inwardly extending lip 70 that extends inwardly with respect to the opening of electrical box 12 to overlie a portion of front edge 28 of side walls 22. As shown in FIG. 7, lip 70 overlies a portion of mounting tab 32.

In use, electrical device 18 is positioned in electrical outlet box 10 on mounting tabs 32. A gasket member 72 having an aperture 74 is positioned over electrical device 18. A cover plate 76 having openings 78 for receiving electrical device 18 is positioned over gasket 72. Screws 42 are inserted through screw holes 82 in cover plate 76, and screw holes 84 in gasket 72 and screw holes 86 in electrical device 18 are threaded into the threaded hole 40 of the respective mounting tabs 32. As shown in FIG. 2, recess 64 has a depth substantially equal to the thickness of cover plate 76 so that the outer surface of cover plate 76 is substantially aligned with the outer face 66 of outer layer 14. Electrical outlet box 10 is provided with one or more openings 88 shown in FIG. 3. The openings can be formed by knockouts which can be removed for receiving electrical cable 16 and a grommet 90 and cable connector as shown in FIG. 2. In the illustrated embodiment of the invention, the hole 88 formed by removing the knockout is formed in end wall 22 of electrical box and in end portion 52 of outer layer 14. In alternative embodiments, a hole can be provided in other locations of the side wall or bottom wall of the electrical outlet box as desired.

As shown in FIGS. 3 and 4, outer layer 14 has thickened portions relative to the middle portion of side portion 50 of outer layer 14 to provide impact resistance to outlet box 10. Outer layer 14 overlies the outer surfaces of electrical box 12, thereby forming a protective outer layer to prevent damage to electrical box 12.

In one embodiment of the invention, outer layer 14 of electrical outlet box 10 is formed by molding outer layer 14 directly on the outer surfaces of electrical box 12. Referring to FIGS. 12 and 13, outer layer 14 is formed by positioning electrical box 12 in a mold cavity 92 of a mold 94. Mold cavity 92 preferably has a dimension corresponding to the outer dimension of the finished outer layer 14 shown in FIG. 1 and to define a gap 96 between the outer surface of electrical box 12 and the inner surface 98 of mold 94. A cover 100 is placed on mold 94 to enclose the mold cavity. A polymerizable material is injected through a port 102 in mold 94 to fill the mold cavity and form outer layer 14. After the polymerizable material is cured, outlet box 10 is removed from mold 94.

Outer layer 14 is preferably formed from an elastomeric polymer that is capable of providing impact resistance to outlet box 10. For example, outer layer 14 can be formed from a flexible polyvinyl chloride containing suitable plasticizers, a polybutylene rubber or other elastomeric polymer.

Figure 14:
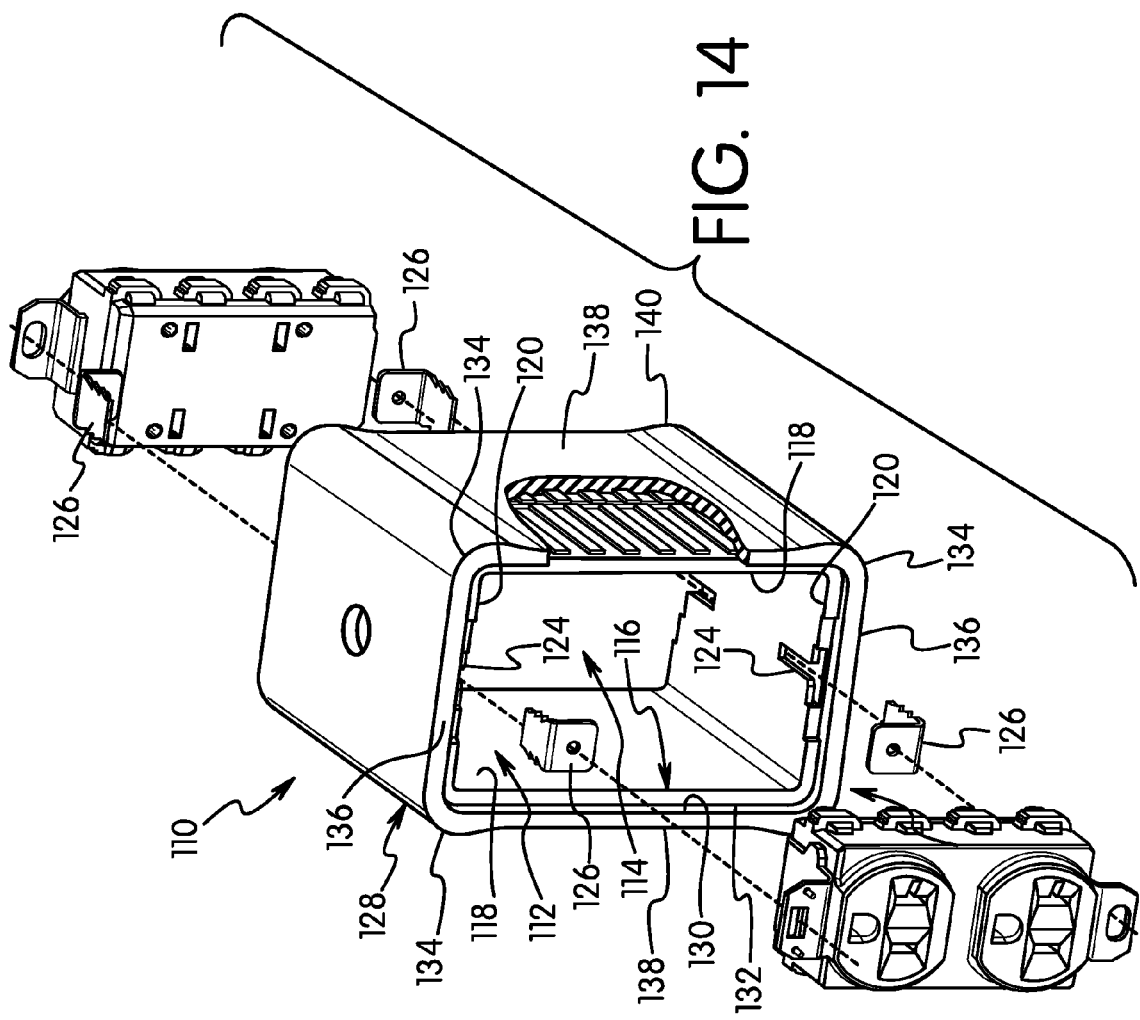
FIG. 14 is a perspective view showing another embodiment of the electrical junction box.

In the embodiment of FIGS. 1-11, the electrical junction box has a bottom wall with an open top end to receive one or more electrical devices. In the embodiment of FIG. 14, electrical junction box 110 is formed with an open front side 112 and an open rear side 114. In the embodiment illustrated, open front side 112 and open rear side 114 are substantially the same and can support an electrical device on each side. Electrical junction box 110 is formed by an inner rigid electrical box 116 having opposite side walls 118 and opposite end walls 120 extending between open sides 112 and 114. The outer faces 122 of end walls 120 have a slot 124 to receive a mounting tab 126 for mounting the electrical box as in the previous embodiment.

The electrical junction box 110 includes an impact resistant outer layer 128 that is secured to the outer surface of electrical box 116 by interlocking ribs on the outer surface of box 116. As shown in FIG. 14, the outer layer 128 forms a skirt 130 around each open end of box 116 to form a lip 132. The lip 132 receives a faceplate (not shown) to cover the electrical device in a manner substantially similar to the embodiment of FIGS. 1-11. The outer layer 128 preferably is formed by directly molding the resilient, impact resistant plastic material on the outer surface of box 116 so that the outer layer is bonded and adhered to the rigid electrical box 116. The outer layer 128 is formed in a similar manner as the previous embodiment with corners 134 and end portions 136 that are thicker than middle portions 138 of side portions 140. The thickened corners provide impact resistance to the rigid electrical box 116.

While various aspects of the invention have been chosen to illustrate the invention, it will be understood by those skilled in the art that various changes and modifications can be made without departing from the scope of the invention as defined in the appended claims.

What is claimed is:

1. An electrical box comprising:
   a box formed of a rigid material and having first and second side walls, first and second end walls extending between said first and second side walls and an open front side, said open front side of said box having a mounting member adapted to receive and support an electrical device; and
   an impact resistant outer layer having end portions adhered to an outer surface of said end walls and side portions adhered to an outer surface of said side walls, said outer layer being made from an elastomeric polymer, said side portions of said outer layer having a substantially concave surface.

2. The electrical box of claim 1, wherein said outer layer overlies said side walls and end walls of said box.

3. The electrical box of claim 2, wherein said side portions and end portions extend beyond said open front side of said box to form a skirt encircling said open front side of said box; and
   a cover coupled to said box and having an outer edge received within said skirt, said cover having an opening for receiving the electrical device.

4. The electrical box of claim 2, wherein each of said side walls and end walls of said box have a substantially uniform thickness.

5. The electrical box of claim 1, wherein the end portions and side portions define corners of said electrical box, and where the outer layer at the corners have a thickness sufficient to provide impact resistance to the electrical junction box.

6. The electrical box of claim 5, wherein the end portions of the outer layer have a thickness greater than the thickness of the middle portion of said side portions.

7. The electrical box of claim 6, wherein the end portions of the outer layer have a thickness substantially equal to the corners of the outer layer.

8. The electrical box of claim 1, wherein said box is made of rigid plastic and where each of said end walls includes a slot and a metal mounting tab received in the slot, wherein said metal mounting tab defines said mounting member.

9. The electrical box of claim 1, wherein said box has a plurality of outwardly extending projections for interlocking with said outer layer.

10. The electrical box of claim 1, wherein said box includes a plurality of outwardly extending ribs and where said outer layer is attached to said ribs.

11. The electrical box of claim 1, wherein said side portions of said outer wall having a middle portion with a thickness less than said end portions.

12. A portable impact resistant electrical box comprising:
    an inner wall made from a rigid material and having an open front side with at least one mounting member at a first end and at least one mounting member at a second opposite end, said mounting members adapted for receiving a fastener for coupling an electrical receptacle device to said open front side;
    an impact resistant outer wall enclosing and adhered to an outer surface of said inner wall, said outer wall being formed from a resilient impact resistant polymer; and
    a face plate coupled to said open front side of said portable electrical box and having an opening adapted for receiving the electrical receptacle device, and where said portable electrical box is adapted for connection to an electrical power cord.

13. The electrical box of claim 12, wherein said outer wall is molded over said inner wall, and where said inner wall defines first and second side walls and first and second end walls extending therebetween.

14. The electrical box of claim 13, wherein said outer wall has a width greater than a width of said inner wall and forms a skirt encircling and extending from said open front side of said inner wall and surrounding a perimeter of said face plate.

15. The electrical box of claim 13, wherein said inner wall has a substantially rectangular shape having corners between said side walls and a respective end wall, and where said outer wall has a thickness at said corners greater than a thickness overlying said side walls.

16. The electrical box of claim 15, wherein said side walls and end walls of said inner wall have a substantially uniform thickness, and said outer wall has a middle portion overlying said side walls with a thickness less than the thickness of said corners to form a side wall portion with a substantially concave outer surface.

17. The electrical box of claim 16, wherein said outer wall has end portions overlying said end walls with a thickness substantially equal to the thickness of the corners.

18. The electrical box of claim 12, wherein said inner wall has a plurality of outwardly extending projections embedded in said outer wall.

19. The electrical box of claim 12, wherein said inner wall has a plurality of outwardly extending ribs interlocking with an inner surface of said outer wall.

20. The electrical box of claim 12, wherein said inner wall includes a first end and a second end, each of said ends having a slot and a mounting tab received in said slot, and wherein said mounting tab defines said mounting member.

21. The electrical box of claim 12, wherein said outer wall has a hardness less than a hardness of said inner wall.

22. The electrical box of claim 21, wherein said outer wall is formed from a resilient elastomeric polymer to form an impact resistant outer surface of said electrical junction box.

23. The electrical box of claim 12, further comprising an electrical device coupled to said mounting member.

24. The electrical box of claim 13, wherein said inner wall includes a bottom wall extending between said side walls and said end walls.

25. The electrical box of claim 13, wherein said inner wall defines said open front side for supporting a first electrical device and an open rear side with a mounting member for supporting a second electrical device and a face plate coupled to said open rear side.

26. A method of producing an electrical box comprising the steps of:

positioning a rigid electrical box in a mold to define a mold cavity between an inner surface of the mold and an outer surface of the electrical box, the electrical box having first and second side walls, first and second end walls extending between the side walls and an open front side, introducing an elastomeric polymer into the mold cavity and molding an outer wall of the elastomeric material on the outer surface of the electrical box, the outer wall having a thickness to provide impact resistance to the electrical box, said outer wall having end portions adhered to the end wall of the electrical box, and side portions adhered to the side walls of the electrical box, said side portions having a middle portion with a thickness less than end portions of the side portions whereby the side portions have a substantially concave surface.

27. The method of claim 26, wherein said outer wall has a width greater than a width of said side and end walls of said box to define a skirt extending from said electrical box and encircling said open front side of said electrical box.

28. The method of claim 26, wherein said outer wall is formed to have a thickness on corners of the electrical box greater than a thickness of the side walls and end walls of the electrical box and to provide impact resistance to the electrical box.

29. The method of claim 26, wherein said elastomeric polymer has a hardness less than a hardness of said electrical box and is flexible and impact resistant.

30. The method of claim 26, wherein the outer surface of the electrical box has a plurality of outwardly extending interlocking members interlocking with the outer wall.

31. The method of claim 30, wherein the interlocking members comprise a plurality of substantially parallel ribs extending outwardly from the side walls of the electrical box.

32. A portable impact resistant electrical box comprising:
a box formed of a rigid material and having first and second side walls and first and second end walls extending between said side walls, said end walls and side walls defining a first open side with a mounting member for supporting a first electrical device and a second open side with a mounting member for supporting a second electrical device;
an outer layer adhered to an outer surface of said box made from an elastomeric polymer and forming an impact resistant outer layer;
a first cover coupled to said box and closing said first open side; and
a second cover coupled to said box and closing said second open side where said portable electrical box is adapted for connection to an electrical power cord.

33. The electrical box of claim 32, wherein said first and second covers each have an opening to receive the first and second electrical devices, respectively.

34. The electrical box of claim 32, wherein said outer layer extends from said first open end to define a first skirt for receiving said first cover, and where the outer layer extends from said second open end to define a second skirt for receiving said second cover, said first and second skirts surrounding said first and second covers, respectively.

35. The electrical box of claim 32, wherein said box has an outer surface with an interlocking member for interlocking with said outer layer.

36. An electrical box comprising:
a box formed of a rigid plastic material and having first and second side walls and first and second end walls extending between said side walls, an open front side for receiving and supporting an electrical device, and an outer surface with interlocking members; and
an impact resistant outer layer adhered to said outer surface and interlocking members.

37. The electrical box of claim 36, wherein said interlocking members are outwardly extending projections interlocking with said outer layer.

* * * * *